United States Patent [19]

Inkrott

[11] Patent Number: 4,952,737
[45] Date of Patent: Aug. 28, 1990

[54] POLYOLEFIN POLYMERIZATION PROCESS AND CATALYST

[75] Inventor: Kenneth E. Inkrott, Houston, Tex.

[73] Assignee: Phillips Petroleum Company, Bartlesville, Okla.

[21] Appl. No.: 255,289

[22] Filed: Oct. 11, 1988

Related U.S. Application Data

[60] Continuation-in-part of Ser. No. 68,506, Jul. 1, 1987, which is a continuation-in-part of Ser. No. 30,311, Mar. 26, 1987, and a continuation-in-part of Ser. No. 30,312, Mar. 26, 1987, which is a continuation of Ser. No. 487,393, Apr. 21, 1983, said Ser. No. 30,311, is a division of Ser. No. 487,393.

[51] Int. Cl.$^5$ ................... C07C 31/30; C07C 39/235
[52] U.S. Cl. .................. 568/851; 568/816; 568/817
[58] Field of Search ................... 568/811, 816, 851

[56] References Cited

U.S. PATENT DOCUMENTS

| | | | |
|---|---|---|---|
| 3,642,746 | 2/1972 | Kashiwa et al. | 526/114 |
| 4,069,169 | 1/1978 | Toyoda et al. | 252/429 B |
| 4,071,672 | 1/1978 | Kashiwa | 526/114 |
| 4,071,674 | 1/1978 | Kashiwa et al. | 526/125 |
| 4,142,323 | 3/1979 | Toyota et al. | 526/125 |
| 4,294,721 | 10/1981 | Cecchin et al. | 526/125 |
| 4,394,291 | 1/1983 | Hawley | 526/119 |
| 4,520,121 | 5/1985 | Inkrott et al. | 526/119 |
| 4,585,749 | 4/1986 | Pierce et al. | 502/107 |
| 4,588,703 | 5/1986 | Cowan et al. | 502/111 |
| 4,683,344 | 7/1987 | Hodek et al. | 568/851 |
| 4,820,672 | 4/1989 | Mehta | 568/851 |

FOREIGN PATENT DOCUMENTS 230 7/1984 South Africa .

*Primary Examiner*—Werren B. Lone
*Attorney, Agent, or Firm*—Beverly M. Dollar

[57] ABSTRACT

An improved polymerization catalyst, its preparation, and use are disclosed. The catalyst is one prepared by reacting a benzoic acid ester, an alkoxy titanium compound, and a magnesium halide having alkanol associated therewith to form a first catalyst component then reacting said first catlyst component with an organoaluminum halide and then reacting the resulting solid with a halogenating agent comprising a titanium halide. Also novel crystalline MgCl$_2$ electron donor complexes are disclosed, one of which, MgCl$_2$.CH$_3$OH, can be used in the preparation of the improved polymerization catalyst herein.

12 Claims, 4 Drawing Sheets

POWER X-RAY DIFFRACTION PATTERNS
OF BALL-MILLED MGCL$_2$ • 4-PHENYL PHENOL

D-1  MILLED  4 HRS, WITH COOLING
D-2  MILLED 24 HRS, WITH COOLING
D-3  MILLED  4 HRS, WITHOUT COOLING
D-7  MILLED  4 HRS, WITHOUT COOLING

POLYOLEFIN POLYMERIZATION PROCESS AND CATALYST

CROSS REFERENCE TO RELATED APPLICATIONS

This application is a continuation-in-part of application Ser. No. 68,506, filed July 1, 1987, which is in turn a continuation-in-part of application Ser. No. 30,311, Mar. 26, 1987, and application Ser. No. 30,312, Mar. 26, 1987, which are a divisional and a continuation, respectively of application Ser. No. 487,393, Apr. 21, 1983 now abandoned.

BACKGROUND OF THE INVENTION

The present invention relates to the polymerization of olefins. In another aspect this invention relates to novel catalysts useful for the polymerization of olefins.

In another aspect this invention relates to novel compositions of matter comprising crystalline magnesium dihalide/electron donor adducts and a method of making same.

In commonly owned U.S. Pat. No. 4,394,291, there is disclosed a number of new high activity polymerization catalysts. The disclosure of said application is hereby incorporated by reference. One of those catalysts types disclosed was prepared by reacting reactants comprising (a) a magnesium dihalide, (b) a benzoic acid ester, and (c) a titanium compound, such as an alkoxytitanium compound, to produce a first catalyst component, then reacting that component with a second catalyst component comprising a precipitating agent, and then reacting the resulting solid product with halogenating agent, such TiCl$_4$.

South African Pat. No. 230/84 reveals that the activity of such catalysts can be affected by the amount of water associated with the magnesium dihalide. The activity obtained with catalysts prepared from magnesium dihalide containing less than 0.5 moles of H$_2$O per mole of magnesium dihalide were inferior to catalysts prepared using magnesium dihalides containing higher levels of water.

The present application is directed to the discovery that the activity of such catalysts can also be improved by adding specified amounts of alkanol to the magnesium dihalide.

SUMMARY OF THE INVENTION

The present invention provides an improved catalyst, the method of its production and the method for its use in polymerization of alpha olefins. The catalyst preparation involves reacting (1) a magnesium dihalide containing at least one alkanol, (2) a benzoic acid ester, and (3) an alkoxytitanium compound to form a first catalyst component, then reacting said first catalyst component with an organoaluminum halide to obtain a solid product, and then reacting the resulting solid product with a halogenating agent comprising a titanium halide.

The present invention also provides new crystalline compositions of matter, one of which can be used as the reactant (1) in the above-mentioned catalyst preparation; as well as the method of making the novel compositions.

BRIEF DESCRIPTION OF THE DRAWINGS

In the drawings, forming a part hereof,

FIG. 1 also depicts the powder x-ray diffraction spectra of anhydrous MgCl$_2$.

DETAILED DESCRIPTION OF THE INVENTION

Figure 1:
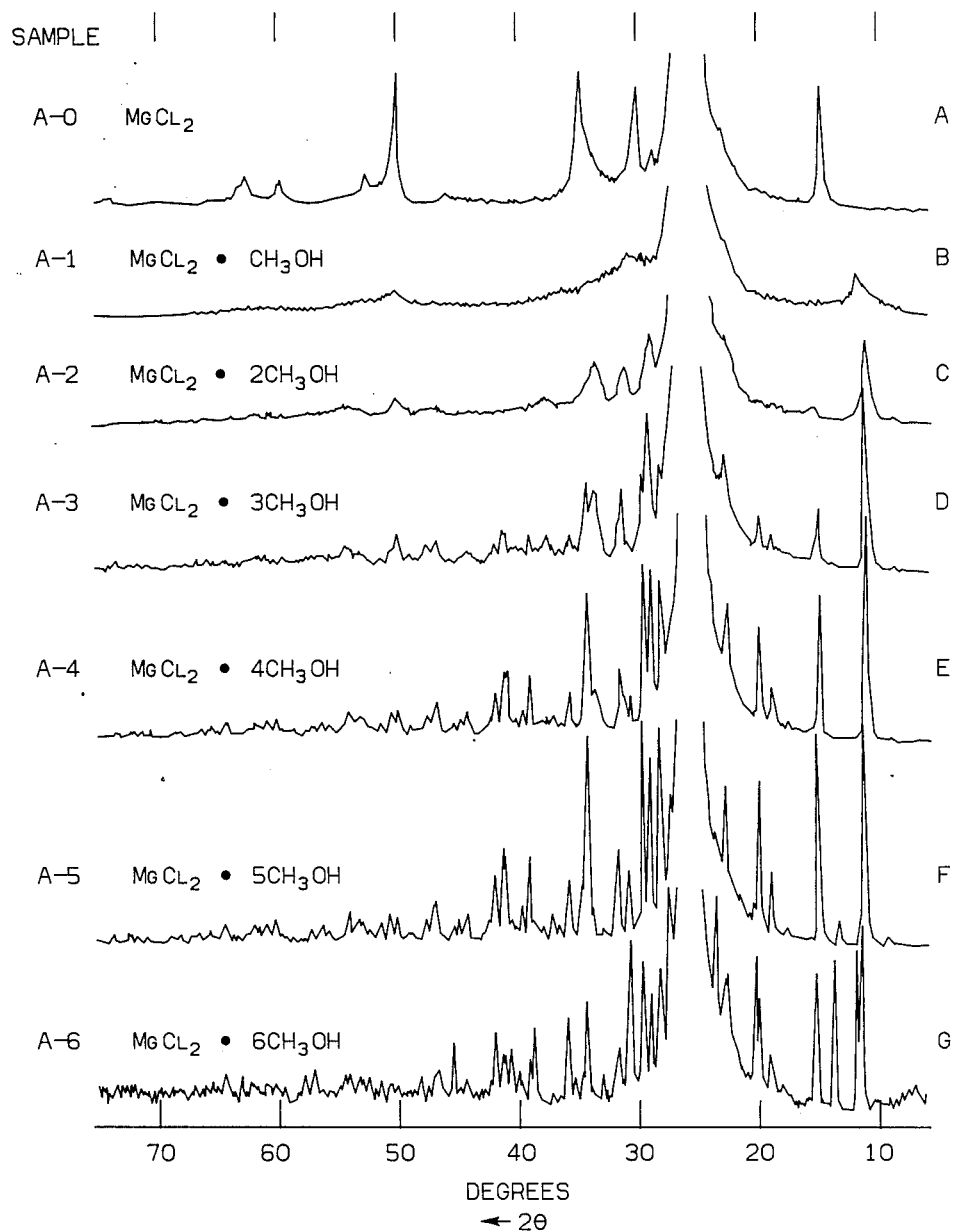
FIG. 1 depicts the x-ray diffraction spectra of the products produced by copulverizing anhydrous MgCl$_2$ and MgCl$_2$.6CH$_3$OH at different molar ratios.

The presently preferred magnesium dihalide is "anhydrous" magnesium dichloride. The term "anhydrous" magnesium dichloride is conventionally used to indicate a magnesium dichloride containing no more than about 1 mole of water per mole of magnesium dichloride. The benefits provided by adding an alkanol to the magnesium dichloride in accordance with the present invention are greatest when the magnesium dichloride contains less than about 0.5 mole of water per mole of magnesium dichloride and is substantially free of organic compounds. The level of water can be determined using routine analysis techniques. Typically, such techniques involve the use of Karl Fischer titration plus other conventional techniques such as X-ray diffraction and elemental analysis for determining whether there are significant amounts of other materials, particularly MgO, associated with the MgCl$_2$.

Alkanols that are considered to be suitable include the non-tertiary aliphatic alcohols containing 1 to 12 carbon atoms per molecule, more preferably 1 to 6 carbon atoms per molecule, and most preferably 1 to 4 carbon atoms per molecule. Specific examples of such alcohols include methanol, ethanol, 1-propanol, 2-propanol, 1-butanol, 2-butanol, 2-methyl-2-propanol, 1-pentanol, 3-methyl-1-butanol, 1-hexanol, 3-hexanol, 1-octanol, 1-dodecanol, and the like and mixtures thereof. Methanol is presently preferred for reasons of efficacy in producing active catalysts as well as for economy.

The alkanol can be added in any amount which will provide an improvement in the productivity of the catalyst. Obviously, the exact amounts can vary depending upon the amount of water associated with the catalyst and the level of improvement desired. For methanol, generally the molar ratio of alcohol to magnesium dihalide is in the range of about 0.2 to about 1.5, more preferably about 0.5 to about 1.1.

The alkoxytitanium compounds are those titanium compounds in which the titanium is bonded to at least one oxygen atom and the oxygen atom is bonded to at least one alkyl radical. The preferred alkoxytitanium compounds are those of the formula

wherein each R is individually selected from an alkyl group containing 1 to 20 carbon atoms and each R can be the same or different. The most preferred are those in which each alkyl group contains 1 to 10 carbon atoms.

The molar ratio of the alkoxytitanium compound to the metal halide compound can be selected over a relatively broad range. Generally, the molar ratio of alkoxytitanium to magnesium dihalide is in the range of about 10/1 to 1/10, more preferably about 2/1 to 1/2.

The term benzoic acid ester is used generically to include substituted as well as unsubstituted benzoic acid esters. Typical examples include ethyl benzoate, ethyl p-methoxybenzoate, ethyl toluate, ethyl p-butoxybenzoate, and butyl benzoate. The preferred benzoic acid esters are those having 8 to 12 carbon atoms per molecule.

In an especially preferred embodiment, a phenol is employed in conjunction with the benzoic acid ester in making the first catalyst component. The term "phenol" is used herein to refer to substituted as well as unsubstituted phenols. Typical examples include phenol, o-methyl phenol, m-methyl phenol, p-methyl phenol, 4-phenyl phenol, o-fluorophenol, m-fluorophenol, p-fluorophenol, p-sec-butyl phenol, p-ethyl phenol, p-isopropyl phenol, p-tertbutyl phenol, p-methoxy phenol, p-cyanophenol, and p-nitrophenol.

The currently preferred combination of ester and phenol is 4-phenyl phenol and ethyl benzoate. The total number of moles of 4-phenyl phenol and ethyl benzoate employed can affect the activity and selectivity of the resulting catalyst. Typically, the ratio of the sum of the moles of those two electron donors to the moles of the titanium alkoxide are in the range of about 5/1 to 1/5, more preferably 3/1 to 2/1. The amount of ethyl benzoate would generally be used in an amount of about 0.15 to about 1 mole per mole of titanium alkoxide. Most preferably about ½ mole of ethyl benzoate is employed per mole of titanium alkoxide.

The metal halide compound and the transition metal compound employed in the present invention are normally mixed together by heating, e.g., refluxing, in a suitable dry (essential absence of water) solvent or diluent, which is essentially inert to these components and the product produced. By the term "inert" is meant that the solvent does not chemically react with the dissolved components such as to interfere with the formation of the product or the stability of the product once it is formed. Such solvents or diluents include, for example, n-pentane, n-heptane, methylcyclohexane, toluene, xylenes and the like. It is emphasized that aromatic solvents are preferred, such as for example xylene because the solubility of the metal halide compound and the transition metal compound is higher in aromatic solvents as compared to aliphatic solvents, particularly at low temperatures. Such mixing temperatures are generally within the range of from about 0° C. to about 50° C. and preferably from about 10° C. to about 30° C. Generally the amount of solvent or diluent employed can be selected over a broad range. Usually the amount of solvent or diluent is within the range of about 20 to about 100 cc per gram of metal dihalide. The temperature employed during the heating step can also be selected over a broad range. Normally the heating temperature is within the range of about 15° C. to about 150° C. when the heating step is carried out at atmospheric pressure. Obviously, the heating temperatures employed could be higher if the pressure employed is above atmospheric pressure. The pressure employed during the heating step does not appear to be a significant parameter.

Generally, the time required for heating the reactants to make the first catalyst component is within the range of about 5 minutes to about 10 hours, although in most instances a time within the range of about 15 minutes to 3 hours is sufficient.

The ester, the titanium alkoxide, and the phenol, when used, can be contacted with the magnesium dihalide-alcohol adduct in any order. However, it is currently preferred to contact the dihalide alcohol adduct first with the phenol and the titanium alkoxide and then to contact that solution with the ester.

The organoaluminum halide catalyst component is selected from compounds of the type having the formula $AlR_nX_{3-n}$ wherein each R is individually selected from saturated and unsaturated hydrocarbyll radicals containing 1 to 20 carbon atoms per radical, X is a halogen, and n is any number such that $1 \leq n \leq 2$. Typical examples include ethylaluminum dichloride, diethylaluminum chloride, and ethylaluminum sesquichloride. The latter compound is currently preferred.

The reaction of the organoaluminum halide with the first catalyst component can be carried out by merely adding the organoaluminum halide to a solution of the first component. It is, however, currently preferred to add a hydrocarbon solution of the halide to the first component solution.

The temperature employed for reacting the second catalyst component, i.e., the organoaluminum halide, and the first catalyst component can be selected over a broad range. Generally, the temperature employed is within a range of about 0° C. to about 50° C. or higher, while temperatures within the range of 20° C. to about 30° C. were most often employed. Since heat is evolved when the first catalyst component and the second catalyst component are mixed, the mixing rate is adjusted as required and additional cooling is employed in order to maintain a relatively constant mixing temperature. It has been found preferable to add the second component to the first component. After completing the mixing, the resulting slurry is stirred or agitated for a sufficient time, generally within a range of about 15 minutes to about 5 hours to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes and the like, to remove any soluble material which may be present. The product is then dried and stored under dry nitrogen.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active olefin polymerization catalyst.

Generally, the reaction between solid product resulting from the reaction of the first and second components with the halide ion exchanging source can be carried out neat or in a liquid medium in which the halide ion exchanging source is soluble. The product from step (2) is generally in a liquid diluent when contacted with the halide ion exchanging source. Any suitable diluent can be employed. Examples include normally liquid hydrocarbons such as n-pentane, n-heptane, cyclohexane, benzene, and xylene.

The temperature employed in step (3) can be selected over a relatively broad range, generally in the range of −25° C. to +25° C., preferably 0° C. to 200° C., with temperatures of 100° C. being most preferred.

The treating time can also be selected over a broad range and generally is within the range of about 10 minutes to about 10 hours. While the weight ratio of the halide ion exchanging source to the product of step (2) can be selected over a relatively broad range, the weight ratio of the halide ion exchanging source to the product of step (2) is generally within a range of about 10:1 to about 1:10 and more generally from about 7:1 to about 1:4. Following the treatment of the product of step (2) with the halide ion exchanging source the surplus halide ion exchanging source is removed by washing the solid catalyst with a dry (essential absence of water) liquid such as a hydrocarbon of the type previously disclosed, n-hexane, or xylene for example. The resulting catalyst, after drying, is stored under dry nitrogen.

The currently preferred titanium halide for use as the halide ion exchanging source is $TiCl_4$. In an especially preferred embodiment, the $TiCl_4$ is employed in conjunction with a halide of silicon such as $HSiCl_3$ or $SiCl_4$.

Generally, $HSiCl_3$ and $SiCl_4$ are employed in such amounts that the sum of their volumes is about equal to the volume of the $TiCl_4$. Typically, the molar ratio of $TiCl_4$ to $SiCl_4$ would preferably be in the range of about 3/1 to about 4.5/1 and the molar ratio of $HSiCl_3$ to $SiCl_4$ in the range of about 2.5/1 to 4/1.

The alkanol can be combined with the magnesium dihalide in any suitable manner. In one embodiment the magnesium compound is just mixed with a hydrocarbon solution or dispersion of the alkanol. This generally results in the magnesium compound going into solution more readily when combined with the titanium alkoxide.

A more preferred embodiment involves combining the magnesium dihalide with a suitable amount of a magnesium dihalide alcohol couples in a suitable liquid solvent or diluent as described above for use in combining the metal halide and the transition metal compound. The currently most preferred embodiment involving this technique uses a mixture of anhydrous magnesium dihalide and the hexa alcohol adduct of the magnesium dihalide, most preferably in a molar ratio of about 5/1, respectively.

Another technique for combining the magnesium dihalide and the alcohol involves copulverization of the magnesium dihalide with a suitable amount of the alcohol. The most preferred embodiment of this technique involves copulverization of anhydrous magnesium dihalide and the hexa alcohol adduct of the magnesium dihalide, for example, ball milling $MgCl_2$ and $MgCl_2.6CH_3OH$.

Copulverization can be carried out using a ball mill, a vibratory mill or the like preferably in the substantial absence of oxygen or water. The term "copulverization" as used in this application denotes pulverization which imparts a violent pulverizing effect to a material, and excludes such means as mere mechanical stirring.

The pulverization conditions should preferably be chosen according to the types of materials or pulverizing apparatus used. Generally, the pulverization is about 1 hour to about 10 days, more preferably 2 hours to 2 days, most preferably 4 hours to 16 hours. The pulverization can be carried out at room temperature, and it is not especially necessary to cool or heat the pulverization system. Usually, however, the pulverization is conducted at temperatures in the range of 0° to 100° C. For the copulverization of $MgCl_2$ and $MgCl_2.6CH_3OH$ the pulverization is preferably conducted at temperatures in the range of 20°−50 = C., more preferably 25°−30° C. It has been discovered that if particular amounts of $MgCl_2$ and $MgCl_2.6CH_3OH$ are used it is possible through pulverization to obtain $MgCl_2$ alcohol adducts that show sharp x-ray diffraction spectra characteristic of crystalline adducts. Such adducts have different x-ray diffraction spectra from either of the starting materials. Thus, the preferred technique of pulverization for $MgCl_2$ and $MgCl_2.6CH_3OH$ involves intense vibration ball-milling of the reactants until the x-ray diffraction pattern of the reaction mixture shows the absence of diffraction peaks of the starting materials and the presence of a sharp new peak, particularly at $2\theta = 12°$. In this embodiment higher temperatures have been found to allow one to more quickly obtain product exhibiting the sharp peaks characteristic of crystalline materials.

An example of violent pulverization in a vibratory ball mill would involve placing 20 to 40 grams of material to be treated in a 210 cc spherical steel vessel, placing the vessel on a Siebtechnik Model 6L-B vibratom vibration mill with 7/16 inch diameter chrome steel balls weighing 621 g and then operating the mill at 1760 oscillations per minute with $\frac{1}{8}$ to $\frac{1}{4}$ inch amplitude. The length of time needed can be readily determined by routine experimentation by conducting an x-ray diffraction analysis upon the product under different operating conditions. It has been observed that after a certain amount of time additional milling produces very little additional change in the sharpness of the peaks.

When one is ball milling anhydrous $MgCl_2$ and $MgCl_2.6CH_3OH$ it is currently preferred to use them in an amount to give a product with a $MgCl_2/CH_3OH$ molar ratio of no more than 1/1. This generally requires using approximately 5 moles of anhydrous $MgCl_2$ per mole of the hexa methanol adduct of $MgCl_2$ ($MgCl_2.6CH_3OH$). When using anhydrous $MgCl_2$ and $CH_3OH$, the components should be used in a ratio of about 1/1. Ball milling with a $MgCl_2/CH_3OH$ molar ratio of 1/1 gives a $MgCl_2.6CH_3OH$ that is substantially free of the presence of $MgCl_2.6CH_3OH$ as shown by x-ray diffraction. When larger amounts of methanol are present, the x-ray diffraction data indicate that $MgCl_2.6CH_3OH$ is still present even after long periods of grinding. However, when small amounts of $CH_3OH$ ($\leq 0.5$ mole per mole $MgCl_2$) are used, the crystalline adduct considered to be a new composition of matter is not produced.

The composition consisting of substantially pure $MgCl_2.CH_3OH$ having the sharp x-ray diffraction spectrum peaks associated with crystalline materials is considered to be a new composition of matter that cannot be obtained by liquid phase interaction of $MgCl_2$ and methanol, or by the prior art methods of cogrinding a magnesium dihalide with an alcohol. As can be seen in FIG. 1, the ball milled $MgCl_2.CH_3OH$ has an x-ray peak at $2\theta = 12°$. This is a peak not present in normal crystalline $MgCl_2$. In addition in the ball milled $MgCl_2.1CH_3OH$ the peak of crystalline $MgCl_2$ at $2\theta = 15°$ is absent. Also absent are the peaks in the $2\theta$ range of 15°−20° and 45°−55° that are present in crystalline $MgCl_2.6CH_3OH$.

Crystalline adducts of MgCl$_2$ and other electron donors can also be prepared by method of this invention. For instance, crystalline adducts of MgCl$_2$ and phenols can be formed by copulverizing anhydrous MgCl$_2$ and a phenol. The pulverization should be continued for a time period from about 1 hour to 10 days, more preferably 2 hours to 2 days, most preferably 4–24 hours. The pulverization is generally carried out at temperatures in the range of 0°–100° C., more preferably 50°–95° C., most preferably 70°–90° C. These temperatures can generally be achieved by allowing the pulverization to occur absent any cooling of the system.

It is preferable to employ the anhydrous MgCl$_2$ and the phenol in amounts to give a product with a MgCl$_2$/phenol molar ratio of no more than 1/1.

The phenols useful in this invention are generally those previously described herein as useful in the formation of the invention catalyst. Preferred phenols for use in forming the novel compositions of matter are phenol (PhOH) and 4-phenylphenol (4-PP).

Figure 3:
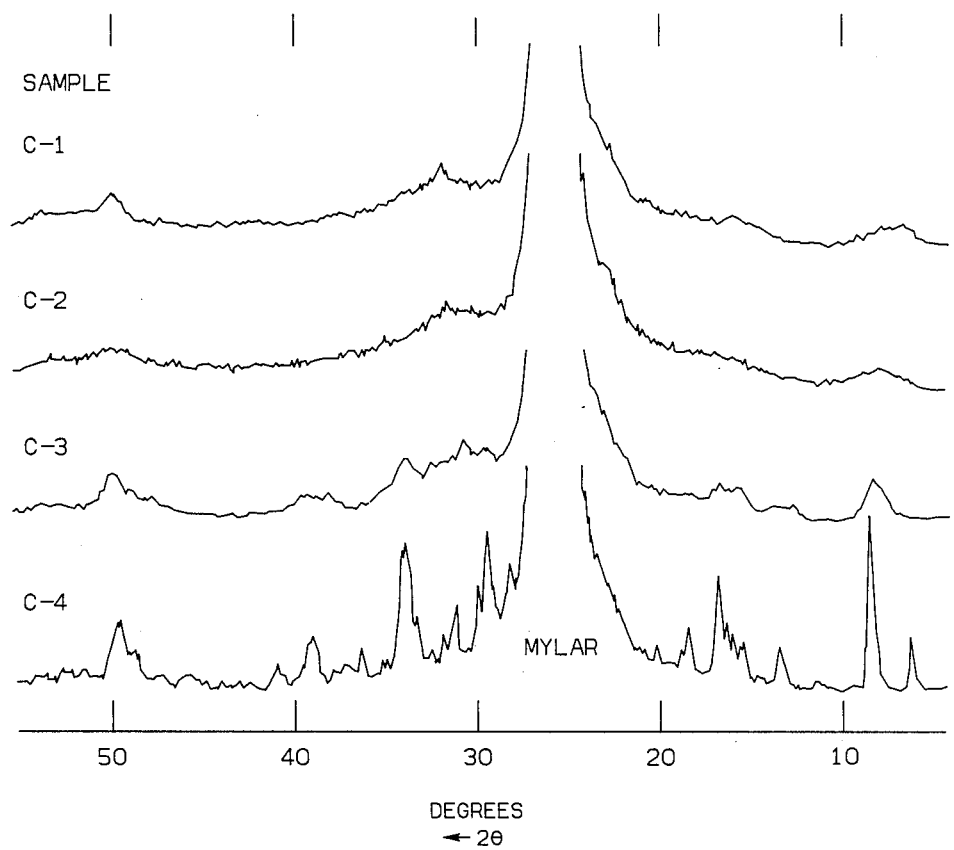
FIG. 3 depicts the powder x-ray diffraction patterns of the products produced by copulverizing anhydrous MgCl$_2$ and phenol wherein time periods of pulverization were varied and the pulverization was carried out with or without cooling.

The composition consisting of substantially pure MgCl$_2$.PhOH having the sharp x-ray diffraction spectrum peaks associated with crystalline materials is considered to be a new composition of matter that cannot be obtained by a liquid phase interaction of MgCl$_2$ and phenol. As can be seen in FIG. 3, the ball milled MgCl$_2$.PhOH has an x-ray peak at approximately $2\theta = 8°$. This is a peak not present in normal crystalline MgCl$_2$ (see FIG. 1 Sample A-O). In addition in the ball milled MgCl$_2$.PhOH the peak of crystalline MgCl$_2$ at $2\theta = 15°$ is absent.

Figure 4:
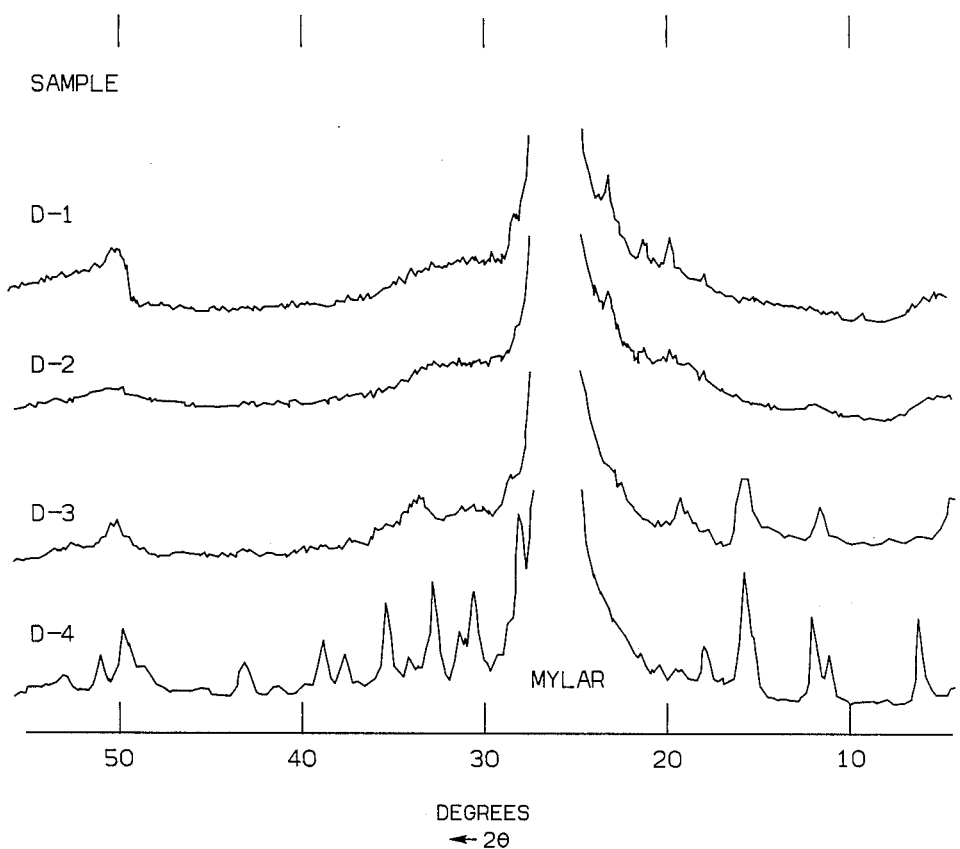
FIG. 4 depicts the powder x-ray diffraction patterns of the products produced by copulverizing anhydrous MgCl$_2$ and 4-phenyl phenol wherein the time period of pulverization was varied and the pulverization was carried out with or without cooling.

The composition consisting of substantially pure MgCl$_2$.4-PP, having the sharp x-ray diffraction spectrum peaks associated with crystalline materials is considered to be a new composition of matter that cannot be obtained by liquid phase interaction of MgCl$_2$ and 4-PP. As shown in FIG. 4, the ball milled MgCl$_2$.4-PP has x-ray peaks at about $2\theta = 18°$, 12°, 11° and 6°. These peaks are not present in normal crystalline MgCl$_2$ (see FIG. 1 Sample A-O). In addition, in the ball milled MgCl$_2$.4-PP the peak of crystalline MgCl$_2$ at $2\theta = 15°$ is absent, although a peak does appear close by at about 15.6°.

The catalyst of the present invention can be used in the polymerization of olefins. Olefins which can be homopolymerized or copolymerization with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a gas phase process, or a solution form process. Aliphatic mono-1-olefins can be copolymerized with other 1-olefins and/or with other smaller amounts of other ethylenically unsaturated monomers, such as 1,3-butadiene, isoprene, 1,3-penta-diene, styrene, alpha-methylstyrene, 4-methyl-1-pentene and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3- butadiene, isoprene, 2-methyl-1,3-butadiene, 1,3-pentadiene, and 1,3-octadiene. Suitable comonomers, besides the conjugated diolefins listed above include mono-1-olefins previously described and vinyl- aromatic compounds generally.

Some suitable vinyl aromatic compounds are those having from about 8 to about 14 carbon atoms per molecule, and include for example styrene and various alkylstyrenes, such as 4-ethylstyrene and such as 1-vinyl-naphthalene.

The weight percent of the conjugated diolefin in the copolymerization mixture can be selected over a relatively broad range. Generally the weight percent of the conjugated diolefin is from about 10 to about 95 weight percent of the other comonomers are from about 90 to about 5 weight percent. However, the weight percent of the conjugated diolefin is preferably from about 50 to about 90 weight percent and the other comonomers are from about 50 to about 10 weight percent.

The inventive catalysts are particularly well suited for producing stereoregular polypropylene, many offering potential for high rates as well as low soluble polymer formation.

Polymerization may be conducted in a liquid phase, in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline and the like.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Groups IA, II, and IIIA of the Periodic Table. Of the organometallic cocatalysts, organoaluminum compounds such as those described above as suitable for use as the second component of the catalyst, are preferred with the most preferred organoaluminum cocatalysts being compounds of the formula R$_3$Al which include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compounds of the cocatalyst to the transition metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

The catalyst is preferably used with a multicomponent cocatalyst system comprising triethylaluminum (TEA), an aromatic ester such as ethyl anisate (EA), ethyl benzoate (EB), methyl-p-toluate (MPT), etc., and diethylaluminum chloride. Best selectivity (stereospecificity) is obtained when the TEA:ester mole ratio is about 2:1. The DEAC, when used, helps in increasing activity. Generally, a TEA:ester:DEAC mole ratio ranging from about 2:1:0.5–3 and preferably about 2:1:2 is employed in bench scale testing for batch polymerization. For a continuous, larger scale process, it becomes possible, for example, when using TEA and MPT to use TEA:MPT mole ratios of about 3:1 to about 5.1 and dispense with the DEAC entirely. A decreased DEAC level is desirable when employing a flash process to recover polymer since the amount of chloride remaining in the polymer is dependent to some extent on the DEAC level.

The polymerization process according to the present invention employing the catalyst and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the monomer is then admitted and maintained at a partial pressure within a range of about 0.5 MPa to find 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent) and unreacted monomers and drying the resulting polymer.

For optimum productivity of polymer of low solubility in the continuous polymerization of propylene preferably the cocatalyst comprising the trialkylaluminum-containing such inert atmosphere unless indicated otherwise. A series of various $MgCl_2$.methanol adducts was prepared in separate one quart beverage bottles from mixtures containing 19.8 g (0.208 mole) of particulate commercially obtained anhydrous $MgCl_2$ (shown by analysis for water content by the Karl Fischer method to contain about 0.5 weight percent water, thus giving an empirical formula of $MgCl_2.0.03\ H_2O$), the specified quantities of reagent grade methanol and 150 mL of reagent grade mixed xylenes. Each mixture was stirred at about 23° C. for 15 hours. To each bottle was charged 25.0 g (0.147 mole) of 4-phenylphenol, hereafter referred to as 4-PP, and 35.8 g (0.105 mole) of titanium tetra-n-butoxide, hereafter referred to as $Ti(OBu)_4$. The stirred reaction mixtures were heated for 15 minutes at 100° C. and to each was then added 7.89 g (0.053 mole) of ethyl benzoate EB. Stirring and heating were then continued an additional 45 minutes at 100° C. Heating and stirring were discontinued and each reaction mixture was diluted with 500 mL of the xylene at about 25° C. While stirring, each mixture was treated with 125 ml( 0.099 mole) of ethylaluminum sesquichloride, EASC, as a 25.4 weight percent solution of EASC in n-heptane. The resulting precipitates (1) were isolated by suction filtration and a 20 g portion of each was treated at 100° C. for 1 hour with 720 g of a mixture consisting of about 56 weight percent $TiCl_4$, 32 weight percent $HSiCl_3$ and 12 weight percent $SiCl_4$. Each resulting product was isolated by suction filtration, washed repeatedly with portions of n-hexane until the filtrate was essentially colorless and dried under an argon stream to obtain the catalyst (II). A control catalyst produced with $MgCl_2.0.05\ H_2O$ and no methanol was prepared as outlined above. The quantities of methanol employed, when used, and the results obtained are given in Table IA. Analyzed catalyst compositions, minus combined oxygen and hydrocarbon groups, is given in Table IB.

In producing the catalyst, the respective mole ratios based on $MgCl_2$ as 1 were:1.0 $MgCl_2$, 0.5 $Ti(OBu)_4$, 0.7 4-PP and 0.25 EB. The mole ratio of $Ti(OBu)_4$ to EASC was about 1.05:1.

TABLE IA

| | | Catalytic Preparation | | | | |
|---|---|---|---|---|---|---|
| | | Calculated Moles $CH_3OH$ | Part I Solids | | Part II Solids (Catalyst) (a) | |
| Run No. | Methanol 2 | Per Mole $MgCl_2$ | Color | Weight g | Color | Weight g |
| IA | 3.2 | 0.48 | Yellow | 35.0 | Purple | 15.5 |
| 2A | 6.4 | 0.96 | Yellow | 41.5 | Purple | 16.2 |
| 3A | 9.6 | 1.4 | Yellow | 52.3 | Light Purple | 12.4 |
| 4A | 12.8 | 1.9 | Yellow | 69.4 | Light Purple | 5.1 |
| 5A | 0 | 0 | Yellow | 38.2 | Light Purple | 17.4 |

(a) Based on treating 20 g of part I solids with the $TiCl_4$—$SiCl_4$—$HSiCl_3$ mixture.

electron donor is contracted with the titanium-containing catalyst prior to being exposed to liquid propylene.

The olefin polymers made with the catalyst of this invention are useful in preparing articles by conventional polyolefin processing techniques such as injection molding, rotational molding, extrusion of film, and the like.

A further understanding of the present invention and its advantages will be provided by the following examples.

EXAMPLE I

All operations were conducted in a dry box containing an argon or nitrogen atmosphere or in containers

TABLE IB

| | Analyzed Catalyst Compositions | | | | |
|---|---|---|---|---|---|
| | Weight Percent (a) | | | | |
| Catalyst No. | Ti | Mg | Cl | Al | Si |
| IB | 2.59 | 15.6 | 57.8 | 1.58 | 0.045 |
| 2B | 2.98 | 15.3 | 56.9 | 1.80 | 0.028 |
| 3B | 2.42 | 16.3 | 57.9 | 3.49 | 0.29 |
| 48 | 2.52 | 16.5 | 61.7 | 3.97 | 0.54 |
| 5B | 4.24 | 17.1 | 57.4 | 0.044 | 0.050 |

(a) The balance of each composition contains combined oxygen and hydrocarbon radicals.

A portion of each dry catalyst was employed in the production of polypropylene in a stirred, stainless liter reactor in one hour runs in liquid propylene under liquid full conditions at 70° C. in the presence of 10 psig hydrogen supplied from a pressurized 300 ml vessel. The cocatalyst used in each run comprised 2.00 mmole of triethylaluminum (3.23 mL of 0.62 M TEA in n-heptane), 1.10 mmole of ethyl anisate and 2.00 mmole of diethylaluminum chloride (DEAC) (3.36 ml of 0.596 M DEAC in n-heptane). Each run was terminated after 1 hour and total polymer yield (reactor solids propylene-soluble polymer) was determined. Flexural modulus was determined in accordance with ASTM D790. The results are given in Table IC.

TABLE IC

Propylene Polymerization, 70° C., 1 Hour, Hydrogen Present

| Run No. | Calculated Mole $CH_3OH$ Per Mole $MgCl_2$ | Catalyst Weight mg | Total Polymer Yield g | Productivity Kg/g/hr | Polymer Solubles, Wt. % Propylene | Polymer Solubles, Wt. % Xylene | Flexural Modulus MPa |
|---|---|---|---|---|---|---|---|
| 1B | 0.48 | 5.2 | 66.6 | 12.8 | 1.4 | 2.1 | 1415 |
| 2B | 0.96 | 9.8 | 76.9 | 7.85 | —(a) | 3.5 | 1420 |
| 3B | 1.4 | 13.3 | 18.7 | 1.41 | — | 5.1 | — |
| 4B | 1.9 | 14.0 | 34.5 | 2.46 | 3.7 | 5.4 | — |
| 5B | 0 | 19.6 | 46.2 | 2.36 | 3.3 | 3.5 | 1450 |

(a)A dash "—" signifies not determined.

The results show that catalysts based on "anhydrous" $MgCl_2$, e.g., $MgCl_2$ containing about 0.05 mole $H_2O$ or less per mole $MgCl_2$ or $MgCl_2 \cdot n$ $CH_3OH$ where n is greater than about 1.4 are about equivalent in performance based on productivity values, e.g. about 1.4 to 2.5 kg polymer per g catalyst per hour. However, when n is greater than zero and less than about 1.2, e.g. about 0.5 to 1, catalyst produced with such adducts shows an unexpected and substantial increase in productivity, e.g. about 3-to-5-fold better. Also, such invention catalyst produce polypropylene which is about 96 to 98 percent insoluble in xylene and which is quite suitable for film, fiber and the like.

EXAMPLE II

The catalyst below was prepared in a 30 gallon (113 L) Pfaudler reactor under a nitrogen blanket.

The reactor was charged at about 25° C. with 7.2 gal (27.2 L) of the mixed xylenes and 963.7 g (10.12 moles) of commercially obtained $MgCl_2$ containing 1.4 weight percent water as determined by the Karl Fischer method, corresponding to the formula $MgCl_2 \cdot 0.08$ $H_2O$. While stirring, a mixture of 360 mL of the xylenes and 360 mL (285 g, 8.90 moles) of methanol was added over a 10 minute period and the resulting mixture was heated to 40°–45° C. for 80 minutes. The calculated $MgCl_2$ to $CH_3OH$ mole ratio is about 1:0.9. The mixture was cooled to about 30° C. and then 1269.9 g (7.46 moles) of 4-PP and 1723.7 g (5.06 moles) of $Ti(OBu)_4$ was added with stirring. The mixture was heated to 90° C.–100° C. for 15 minutes, 362.9 g (2.42 moles) of EB was added and the stirred mixture heated at that temperature for 45 minutes more. The reactor was then cooled to about 50° C. and over a 54 minute period, 10.4 lbs of 25.4 weight percent EASC in n-heptane (4.90 moles EASC) was added with stirring. The resulting mixture was stirred an additional 45 minutes and then cooled to about 30° C. Five gal (18.9 L) of n-hexane was added to the stirred mixture, then the mixture was allowed to settle. The mother liquor was decanted from the precipitate and the precipitate was washed 4 times with 15 gal (57 L) portions of n-hexane by stirring the mixture, allowing the solids to settle and decanting the wash liquor. The reactor was then charged with 31 lbs (14 kg) of a mixture consisting of 54 weight percent $TiCl_4$, 14 weight percent $SiCl_4$ and 32 weight percent $HSiCl_3$. The reactor was heated for 1 hour at 90°–100° C. with stirring. The mixture was then cooled to about 30° C., 5 gal of n-hexane was added, mixed, the solids allowed to settle and the mother liquor decanted. The solids were washed 6 times with 15 gal portions of n-hexane as above and the catalyst transferred to a receiver for storage as a slurry.

The calculated mole ratios based on $MgCl_2$ as 1 are: 1.0 $MgCl_2$, 0.50 $Ti(OBu)_4$, 0.74 4-PP and 0.24 EB. A portion of the catalyst slurry was dried for analysis of the components and for use in testing polymerization of propylene. Analysis disclosed that the catalyst consisted of 2.0 weight percent Ti, 22.2 weight percent Mg, 62.8 weight percent Cl with the balance being combined oxygen and hydrocarbon groups and Si.

Using the same general procedure described before, individual samples of the dry catalyst was employed in propylene polymerization for 1 hour at 70° C. in liquid propylene under liquid full conditions using a 1 gallon (3.77 L) stainless steel stirred reactor. The cocatalyst system employed was TEA, as a 15 weight percent solution in n-heptane premixed with the specified amount of methyl p-toluate (MPT) as about a 33 weight percent solution in n-hexane, and when employed, DEAC as a 25 weight percent solution in n-heptane. In each run, 7.54 mmoles of TEA was used, corresponding to 2 mmoles TEA per liter of reactor contents, e.g. 8.2 mL of the TEA solution per run. Each run was conducted in the presence of 30 delta psi hydrogen supplied from a pressurized 360 mL vessel, the hydrogen being charged after the cocatalyst system but before the reactor was charged with 3 L of liquid propylene. Each run began when the reactor temperature reached 70° C. and the reactor was liquid full. The nominal reactor pressure at this time was about 615 psia. The quantity of catalyst used in each run, the mole ratio of TEA-MPT-DEAC employed and the results obtained are given in Table II.

TABLE II

Propylene Polymerization, 70° C., 1 Hour, 30 Delta PSI Hydrogen

| Run No. | Catalyst Weight mg | Catalyst Mole Ratio | | | Calculated Catalyst Productivity · Kg/g/hr | | Weight % Solubles | | Polymer Properties | |
|---|---|---|---|---|---|---|---|---|---|---|
| | | TEA | MPT | DEAC | Total | Total Less Propylene Solubles | Propylene | Xylene | Melt Flow g/10 min. | Modulus MPa |
| 6  | 23.3 | 2   | 1 | 2   | 15.3 | 15.2  | 0.9 | 2.2 | —   | 1626 |
| 7  | 19.6 | 2   | 1 | 2   | 18.0 | 17.8  | 1.1 | 2.0 | 6.6 | 1769 |
| 8  | 17.1 | 3   | 1 | 3   | 27.3 | 26.9  | 1.3 | 3.8 | 6.3 | 1655 |
| 9  | 18.6 | 1.5 | 1 | 1.5 | 11.5 | 11.4  | 1.2 | 1.8 | 4.9 | 1869 |
| 10 | 14.2 | 4   | 1 | 4   | 32.1 | 31.5  | 1.7 | 3.6 | 7.4 | 1442 |
| 11 | 20.3 | 1   | 1 | 1   | 5.38 | 5.27  | 2.1 | 1.8 | 3.6 | 1766 |
| 12 | 10.4 | 2   | 1 | 1   | 15.1 | 14.9  | 1.0 | 2.5 | 3.3 | 1567 |
| 13 | 15.8 | 2   | 1 | 0.5 | 9.76 | 9.62  | 1.3 | 2.3 | 1.2 | 1471 |
| 14 | 19.5 | 2   | 1 | 0   | 3.13 | 3.08  | 1.6 | 2.1 | —   | 1576 |

Note:
Run 6 conducted with dry catalyst as received.
Runs 7-14 conducted with catalyst sieved through 140 mesh screen.

The results in Table II are representative of the range in values obtained with the Tg-Mg catalyst of this invention using various cocatalyst systems. A presently preferred cocatalyst system is TEA-MPT-DEAC in the respective mole ratio of 2:1:2 with the concentration of TEA per liter of reactor contents normally being about 2 mmoles. Runs 6 and 7 are considered to be "standard" runs in this series, e.g. high catalyst productivity is coupled with low solubles and high flexural modulus. Active catalyst systems are obtained with other cocatalyst mole ratios as well. Runs 8 to 10 are illustrative of the effects of increasing the cocatalyst mole ratio of 2:1:2 to 3:1:3 and 4:1:4, while holding the TEA and DEAC mole ratios constant. Thus, catalyst total productivity increased from about 15-18 kg polymer per g catalyst per hour to about 27-32 kg polymer per g catalyst per hour. However, this is accompanied by increasing slightly the propylene and xylene soluble polymer produced which in turn slightly decreases the flexural modulus of the polymer. A goal is to obtain the highest possible flexural modulus values along with the best catalyst productivity possible. The effects of decreasing the cocatalyst mole ratio of 2:1:2 to 1.5:1:1.5 and to 1:1:1, while holding the TEA and DEAC concentrations constant, on catalyst productivity is shown in Runs 9 and 11. Thus, catalyst total productivity is decreased from about 15-18 kg polymer per g solid catalyst per hour to about 11.5 to about 5.4 kg polymer per g solid catalyst per hour, respectively.

The effect of altering the mole ratio of DEAC in the cocatalyst system from zero to 1 while maintaining a constant 2:1 mole ratio of TEA:MPT is shown in Runs 12, 13 and 14. Thus, as the DEAC mole ratio is decreased form 2 to 1 to 0.5 to zero, total catalyst productivity decreases. The decrease is slight at the 2:1:1 TEA:MPT:DEAC mole ratio with a slight increase in propylene and xylene solubles. However, when the DEAC mole ratio is lowered to 0.5, total catalyst productivity sharply decreases to about 10 kg polymer per g solid catalyst per hour. When no DEAC is employed as in Run 14, total catalyst productivity is again sharply decreased to about 3 kg polymer per g solid catalyst per hour.

EXAMPLE III

A catalyst was prepared by mixing an anhydrous $MgCl_2$ and $MgCl_2 \cdot 6CH_3OH$ in a hydrocarbon then adding 4-phenylphenol and titanium tertrabutoxide. The resulting mixture was stirred with heating and then ethyl benzoate was added followed by more stirring and heating. It was noted that the dissolution of the magnesium dihalide appeared to be much more complete than in instances where $MgCl_2$ was simply combined with methanol. The molar ratios of the reactions relative to the $MgCl_2$ were as follows: 4-phenylphenol/$MgCl_2$ 0.75/1, titanium tetrabutoxide/$MgCl_2$ 0.5/1, and ethylbenzoate/$MgCl_2$ 0.25/1.

The resulting solution was then contacted with EASC to obtain a precipitate using a technique of the type disclosed in the previous examples. The resulting precipitate was isolated and contacted with a mixture of $TiCl_4$, $SiCl_4$, and $HSiCl_3$ at 100° C. for 1 hour.

The resulting catalyst had less visible inhomogeneity than catalysts previously obtained when methanol was added directly to the $MgCl_2$. The yield of catalyst obtained by this technique was 0.89 g of catalyst per g of titanium tetrabutoxide or 1.58 g of catalyst/g of $MgCl_2$. This was slightly better than the yield obtained in the preps using the direct addition of methanol.

| The elemental analysis of the catalyst was | | | | |
|---|---|---|---|---|
| Ti | Mg | Cl | Si | Al |
| % 3.18 | 14.9 | 60.8 | 0.1 | 2.25 |

The resulting catalyst was then used to polymerize propylene at 70° C. in a 1 gallon reactor using various cocatalyst systems. The results are summarized in Table III.

TABLE III

| Activity Kg/g/h | Solubles, Wt-% | | Cocatalyst - Mole Ratios | Flex Mod, MPa | MF |
|---|---|---|---|---|---|
| | $C_3^=$ | Xyl | | | |
| 25.6 | 3.4 | 3.5 | TEA/MPT/DEAC - 2:1:2 | 1723 | 9.8 |
| 15.0 | 3.3 | 3.4 | TEA/MPT/DEAC - 2:1:2 | 1500 | 10.6 |
| 14.5 | 3.2 | 4.1 | TEA/MPT/DEAC - 2:1:2 | 1555 | 11.0 |
| 13.1 | 3.5 | 4.9 | TEA/MPT - 2.75:1 | 1497 | 6.7 |
| 19.5 | 3.3 | 7.5 | TEA/PhSi(OEt)$_3$ - 2.75:1 | 1240 | 21.0 |

TABLE III-continued

| Activity | Solubles, Wt-% | | | Flex | |
|---|---|---|---|---|---|
| Kg/g/h | $C_3^=$ | Xyl | Cocatalyst - Mole Ratios | Mod, MPa | MF |
| 19.3 | 3.0 | 5.0 | TEA/MPT/PhSi(OEt)$_3$ - 8:1:1 | 1410 | 7.5 |

EXAMPLE IV

Another catalyst was prepared in a manner similar to that used in preparing the catalyst of Example III. The only difference in the catalyst prep involved the reduction of the amount of ethylbenzoate to 0.25 moles/mole of Ti(OBu)$_4$ as compared to 0.5 moles/mole of Ti(OBu)$_4$ used in Example III.

The resulting catalyst contained 4.22 weight percent Ti, 18.3 weight percent Mg, and 52.1 weight percent Cl.

The results of propylene polymerization carried out using this catalyst with various cocatalysts are summarized in Table IV.

TABLE IV

| Activity | Solubles, Wt-% | | | |
|---|---|---|---|---|
| Kg/g/h | $C_3^=$ | Xyl | Cocatalyst - Mole Ratio | MF |
| 10.6 | 3.8 | 6.1 | TEA/MPT/DEAC - 2:1:2 | 8.8 |
| 6.7 | 5.0 | 6.9 | TEA/MPT - 2.75:1 | 7.4 |
| 11.4 | 2.4 | 10.9 | TEA/PhSi(OEt)$_3$ - 2:1 | 7.5 |
| 12.1 | 2.1 | 9.5 | TEA/MPT/PhSi(OEt)$_3$ - 8:1:1 | 3.5 |

Still another catalyst was prepared in a manner similar to that used in preparing the catalyst of Example III. The only difference in the catalyst prep was that the amount of ethylbenzoate was 0.165 mole/mole of Ti(OBu)$_4$ as compared to 0.05.

The resulting catalyst contained 4.1 weight percent Ti, 15.11 weight percent Mg, and 46.8 weight percent Cl.

The result of propylene polymerization carried out using this catalyst with various cocatalysts are summarized in Table V.

TABLE V

| Activity | Solubles, Wt-% | | | | Flex |
|---|---|---|---|---|---|
| Kg/g/h | $C_3^=$ | Xyl | Cocatalyst - Mole Ratios | MF | Mod, MPa |
| 12.5 | 2.4 | 3.9 | TEA/MPT/DEAC - 2:1:2 | 7.5 | 1640 |
| 6.2 | 3.2 | 4.8 | TEA/MPT - 2.75:1 | 7.0 | 1390 |
| 23.0 | 2.3 | 5.4 | TEA/MPT/PhSi(OEt)$_3$ - 8:1:1 | 12.9 | 1365 |
| 20.8 | 2.4 | 8.4 | TEA/PhSi(OEt)$_3$ - 4:1 | 19.5 | 1215 |
| 13.3 | 1.8 | 6.2 | TEA/MPT/CH$_3$Si(OEt)$_3$ - 8:1:1 | 2.8 | 1375 |

EXAMPLE VI

The catalysts of Examples III-V were also used to polymerize ethylene. The cocatalyst used in this polymerization was 1.0 ml of 15 weight % TEA.

The results are summarized in Table VI.

Table VI

| Catalyst Example | Activity Kg/g/h | MI |
|---|---|---|
| III | 34.1 | 10.6 |
| III | 18.4 | 64.5 |
| IV | 30.6 | 10.3 |
| IV | 24.6 | 18.0 |

EXAMPLE VII

Another series of catalysts were prepared by mixing MgCl$_2$ and CH$_3$OH in a solution to evaluate the effect of the methanol on the catalyst activity. Control catalysts were prepared using anhydrous MgCl$_2$, in one case and MgCl$_2$.6CH$_3$OH in another case. The catalysts were used with a cocatalyst system of TEA/MPT/DEAC having the respective molar ratio of 2/1/2. The results are summarized in Table VIII. The reactants were the same except for the differences shown in the Table.

Table VII

| MgCl$_2$ Type | Activity Kg/g/h | Solubles | | Flex Modulus |
|---|---|---|---|---|
| | | $C_3^=$ | Xyl | |
| 2MgCl$_2$ + 2CH$_3$OH + Ti(OBu)$_4$ | 9.9 | 2.3 | 3.0 | 1590 |
| MgCl$_2$ + CH$_3$OH + Ti(OBu)$_4$ | 8.9 | 1.7 | 3.3 | 1604 |
| 2MgCl$_2$ + Ti(OBu)$_4$ | 0.7 | 11.0 | — | — |
| MgCl$_2$.6CH$_3$OH + Ti(OBu)$_4$ | 1.2 | 8.1 | 7.1 | 1487 |

Table VII reveals that catalysts prepared with MgCl$_2$ having about 1 mole of methanol associated with it were much more active than MgCl$_2$ having no methanol or MgCl$_2$.6CH$_3$OH.

EXAMPLE VIII

Another series of catalysts were prepared using MgCl$_2$-alcohol adducts in which the alcohol had been added to the MgCl$_2$ by ball milling MgCl$_2$ and MgCl$_2$.6CH$_3$OH in various ratios.

As a control a catalyst was prepared using anhydrous MgCl$_2$.

The catalyst preps were carried out in the same manner as described in previous examples, the molar ratio of the reactants to the Ti(OBu)$_4$ being as follows: MgCl$_2$ 2/1; 4-phenylphenol 1.5/1; and ethylbenzoate 0.5/1.

The catalysts prepared using the ball milled MgCl$_2$-alcohol adduct were noted to result in more complete dissolution of the MgCl$_2$ than had been observed when the MgCl$_2$ alcohol adduct was prepared by simply slurrying anhydrous MgCl$_2$ and methanol.

The resulting catalysts were used to polymerize propylene using a cocatalyst system of triethylaluminum, ethyl anisate, and diethylaluminum chloride. The results are summarized in Table VIII.

TABLE VIII

Ball Milled CH$_3$OH.MgCl$_2$ Catalysts

| Moles CH$_3$OH | mg cat. | g Polymer | Prod. (Kg/g/h) | % Solubles C$_3$= | xyl | tot | Melt Flow | Flex. Mod. (MPa) | Dens. (g/cc) |
|---|---|---|---|---|---|---|---|---|---|
| 0.0 | 10.8 | 29.7 | 2.75 | 4.8 | 3.8 | 8.6 | 5.2 | — | .9063 |
| 0.5 | 9.9 | 53.7 | 5.42 | 3.7 | 2.9 | 6.6 | 7.2 | 1543 | .9073 |
| 1.0 | 12.9 | 61.0 | 4.73 | 2.0 | 2.4 | 4.4 | 2.5 | 1495 | .9074 |
| 1.5 | 10.3 | 50.7 | 4.92 | 3.7 | 3.6 | 7.3 | 4.7 | 1411 | .9065 |
| 2.0 | 34.6 | 21.3 | .614 | 6.9 | 10.6 | 17.5 | 9.8 | — | .9039 |
| 3.0 | 16.1 | 27.3 | 1.70 | 7.0 | 5.8 | 12.8 | 8.0 | — | .9052 |
| 4.0 | 27.4 | 9.41 | .343 | 13.9 | 9.9 | 23.8 | 5.9 | — | .9043 |
| 6.0 | 21.1 | 7.65 | .363 | 21.6 | 13.6 | 35.2 | 10.9 | — | .9021 |

The data in Table VIII again reveals that the amount of methanol associated with the MgCl$_2$ has a significant effect upon the activity of the catalyst. Specifically, the catalysts prepared from MgCl$_2$ having 0.5 to 1.5 moles of methanol per mole of MgCl$_2$ gave almost twice the activity of anhydrous MgCl$_2$ having no methanol associated with it. The data further shows that methanol levels of 2 or higher provided no improvement.

For the following examples, the anhydrous MgCl$_2$ used was obtained from Timet and was experimentally determined as explained in Example IX, A-0 to contain less than 0.5 moles H$_2$O, and the MgCl$_2$.6CH$_3$OH was prepared by dissolving the anhydrous MgCl$_2$ indicated above in reagent grade methanol, followed by azeotropic distillation with hexane to remove any excess methanol.

EXAMPLE IX

Production of Methanol Adducts of MgCl$_2$

In each run, a dry, clean, spherical steel vessel of 210 mL capacity containing 110, 7/16 inch (1.1 cm) chrome steel balls (621 g) was brought into a dry box and loaded with the specified weights of anhydrous MgCl$_2$ and MgCl$_2$.6CH$_3$OH. The vessel was crapped, removed from the dry box and attached to a Model 6L-B Siebtechnik vibration mill, operating at 1760 oscillations per minute with an amplitude of about ¼ inch (0.6 cm). Milling time was 4.0 hours while the vessel was generally cooled with spraying water.

Each of the resulting products was submitted for determination of its powder x-ray diffraction pattern (XRD analysis). The powder specimens for XRD were prepared in a dry box by loading the sample onto a conventional aluminum holder and then covering the sample holder with Mylar film to exclude moisture and air. A Phillips XRG 3100 XRD apparatus was employed having a variable divergent slit, a 0.005 mm receiving slit, and a graphite monochromometer, using CuK$\alpha$ rays produced by a 40 KV, 25 m A generator. A 1½ hour scan of $2\theta = 0°-90°$ was made using a nitrogen purge camera.

A-0: MgCl$_2$

The vessel containing the dry, clean steel balls was taken into the dry box and charged with 25.0 g (263 mmoles) of anhydrous MgCl$_2$ containing less than 0.05 weight percent water as previously determined by volumetric gas determination of a sample reacting with Grignard reagent in tetrahydrofuran. The MgCl$_2$ was charged to the vessel in a dry box. The vessel was cooled with spraying water during the milling process which lasted 4 hours.

After milling, the vessel was returned to the dry box and unloaded through a sieve yielding a free flowing powder. A sample of the product was analyzed by XRD. The X-ray pattern is reproduced as Sample A-0 in FIG. 1.

A-1: MgCl$_2$.CH$_3$OH

The vessel containing the dry, clean steel balls was taken into the dry box and charged with 15.59 g (164 mmoles) of anhydrous (MgCl$_2$ and 9.41 g (32.7 mmoles) of MgCl$_2$.6CH$_3$OH. The vessel was cooled with spraying water during the milling process.

After milling, the vessel was returned to the dry box and unloaded through a sieve yielding a free flowing white powder. A sample of the product was analyzed by XRD. The X-ray pattern is reproduced as Sample A-1 in FIGS. 1 and as Sample A-1 in FIG. 2.

A-2: MgCl$_2$.2CH$_3$OH

The vessel containing the steel balls was taken into the dry box and charged with a 9.96 g (105 mmoles) sample of the anhydrous MgCl$_2$ and 15.04 g (52.3 mmoles) of MgCl$_2$.6CH$_3$OH. the contents were milled 4 hours, cooling the vessel with spraying water. The product was recovered as before yielding 23.65 g as a free flowing white powder.

A sample of the product was analyzed by XRD. The X-ray pattern is reproduced as Sample A-2 in FIG. 1.

A-3: MgCl$_2$.3CH$_3$OH

The vessel containing the steel balls was taken into the dry box and charged with a 6.22 g (65.3 mmoles) sample of the anhydrous MgCl$_2$ and 18.78 g (65.3 mmoles) of MgCl$_2$.6CH$_3$OH. The contents were milled 4 hours, cooling the vessel with spraying water. The product was recovered as before yielding 24.23 g as a free flowing white powder.

A sample of the product was analyzed by XRD. The X-ray pattern is reproduced as Sample A-3 in FIG. 1.

A-4; MgCl$_2$.4CH$_3$OH

The vessel containing the steel balls was taken into the dry box and charged with a 3.55 g (37.3 mmoles) sample of the anhydrous MgCl$_2$ and 21.45 g (74.6 mmoles) of MgCl$_2$.6CH$_3$OH. The contents were milled 4.0 hours, cooling the vessel with spraying water. The product was recovered as before yielding a free flowing white powder weighing 24.01 g.

A sample of the product was analyzed by XRD. The X-ray pattern is reproduced as Sample A-4 in FIG. 1.

A-5: MgCl$_2$.5CH$_3$OH

The vessel containing the dry, clean steel balls was taken into the dry box and charged with a 1.55 g (16.3 mmoles) sample of the anhydrous MgCl$_2$ and 23.45 g (81.6 mmoles) of MgCl$_2$.6CH$_3$OH. The contents were milled 4.0 hours, cooling the vessel with spraying water. The product was recovered as before yielding a free flowing white powder. XRD spectrum of the product is shown as Sample A-5 in FIG. 1.

A-6: MgCl$_2$.6CH$_3$OH

The vessel containing the dry, clean steel balls was taken into the dry box and charged with 25.0 g (87.0 mmoles) of $MgCl_2.6CH_3OH$. The contents were milled 4.0 hours, cooling the vessel with spraying water. The product was recovered as before yielding a free flowing white powder. XRD spectrum of the product is shown as Sample A-6 in FIG. 1.

EXAMPLE X

For this example, $MgCl_2$ methanol adducts were ball milled for various time periods without cooling the system.

B-2 $MgCl_2.CH_3OH$, 4 hours milling.

The vessel containing the dry, clean steel balls was taken into the dry box and charged with a 15.59 g (164 mmoles) sample of the anhydrous $MgCl_2$ and 9.41 g (32.7 mmoles) of $MgCl_2.6CH_3OH$. The contents were milled for 4.0 hrs. without cooling the vessel or its contents. At the end of the time period indicated, the vessel was removed to the dry box and a 1.0 g samples was removed. XRD spectrum of the product is shown as Example B-2 in FIG. 2.

B-3 $MgCl_2.CH_3OH$, 28.4 hours milling

The vessel with the product remaining after the sample was removed in B-2 was removed from the dry box and milling was continued for another 24.4 hours without cooling the vessel or its contents. Thus the product in the vessel was milled a total of 28.4 hours. The vessel was then removed to the dry box and the product was recovered as explained in the previous example. XRD spectrum of the product is shown as Sample B-3 in FIG. 2.

B-4 $MgCl_2.2CH_3OH$, 4 hours milling

The vessel containing the dry, clean steel balls was taken into the dry box and charged with a 9.96 g (105 mmoles) sample of the anhydrous $MgCl_2$ and 15.04 g (52.3 mmoles) of $MgCl_2.6CH_3OH$. The contents were milled for 4.0 hours without cooling. The product was recovered as before. XRD spectrum of the product is shown as sample B-4 in FIG. 2.

Figure 2:
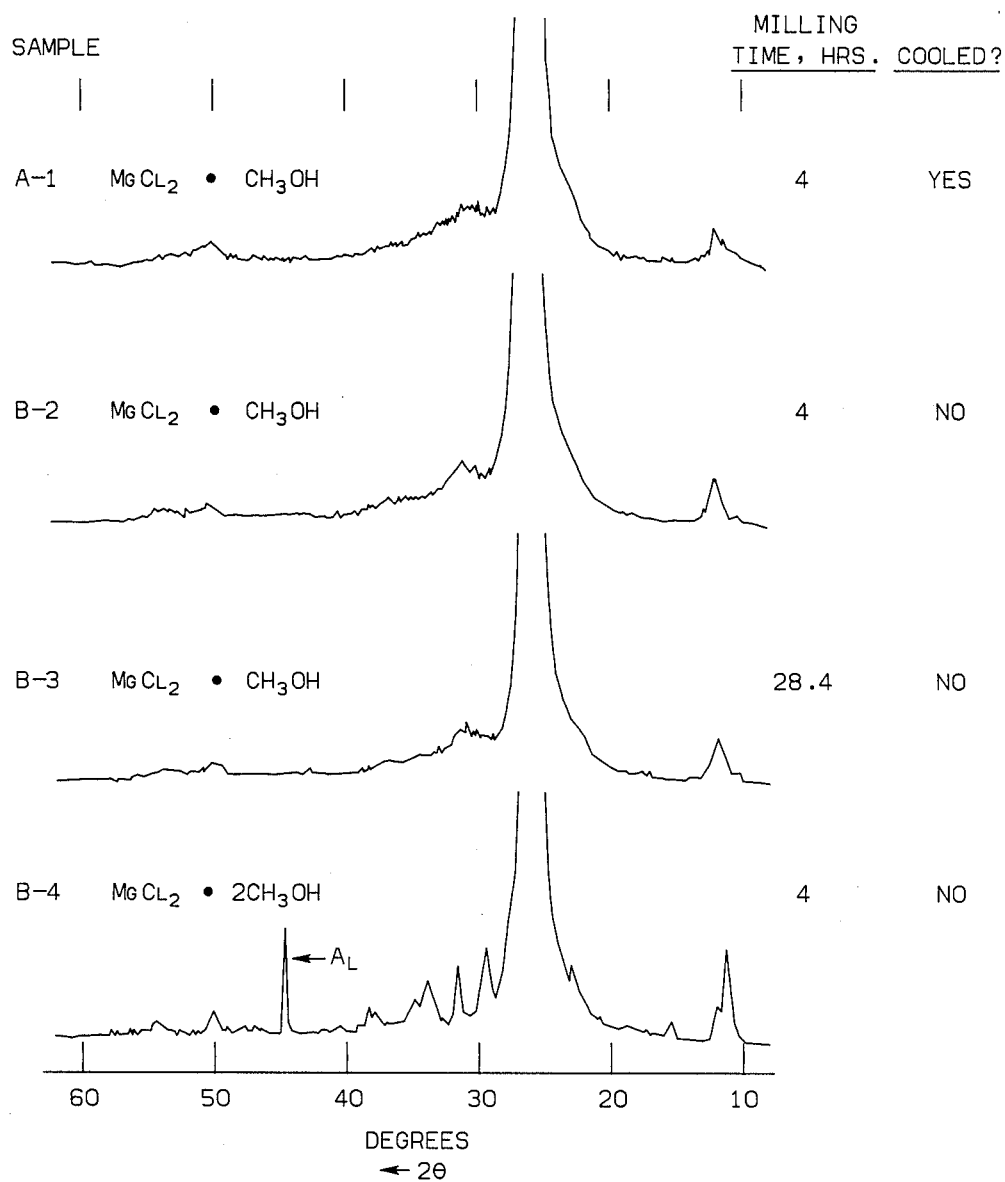
FIG. 2 depicts the powder x-ray diffraction spectra of the products MgCl$_2$.CH$_3$OH wherein the time period of pulverization was varied and wherein the pulverization was accomplished with or without cooling the system.

A comparison of the XRD spectra in FIG. 1 and FIG. 2 demonstrates the separate identity of the $MgCl_2.CH_3OH$ crystalline complex. Referring to FIG. 1 sample A-0 $MgCl_2$ gives intense peaks at $2\theta=15°$, $35°$, and $50°$. The $MgCl_2.xCH_3OH$ adducts featured in samples A-1 through A-6 exhibit no peak 50°. The $MgCl_2.CH_3OH$ adduct (Sample A-1) shows no peak at 15° but has a new peak at 12°. The $MgCl_2.6CH_3OH$ adduct (Sample A-6) exhibits a peak at 11.4° but not at 12°. Samples A-2 through A-6 do not appear to exhibit a peak at 12° but rather at 11.4° and at 15°, tending to indicate that the higher molar ratio adducts are in fact mixtures of $MgCl_2$ and $MgCl_2.6CH_3OH$. Referring to FIG. 2, again the $MgCl_2.CH_3OH$ adducts (Samples A-1, B-2 and B-3) exhibit the peak at $2\theta=12°$. Note that Sample B-4, the $MgCl_2.2CH_3OH$ adduct, when milled without cooling, appears to exhibit a peak at $2\theta=11.4°$ (believed to be due to the presence of $MgCl_2.6CH_3OH$), but also shows a peak at 12° indicating the presence of the novel crystalline complex $MgCl_2.CH_3OH$.

EXAMPLE XI

Production of crystalline phenol adducts of $MgCl_2$

C-1 $MgCl_2.PhOH$, 4 hours milling

The vessel containing the dry, clean steel balls was taken into the dry box and charged with a 12.57 g (132 mmoles) sample of the anhydrous $MgCl_2$ and 12.43 g (132 mmoles) of phenol (obtained from Baker, containing less than 0.1% $H_2O$). The contents were milled for 4 hours, cooling the vessel with spraying water.

After milling, the vessel was returned to the dry box and unloaded through a sieve, yielding a free flowing white powder with a faint reddish tinge. A sample of the product was analyzed by XRD. The spectrum is reproduced as sample C-1 of FIG. 3. Note that the relatively smooth lines in the spectrum of this sample denote the amorphous nature of the product.

C-2 $MgCl_2.PhOH$, 10 hours milling

The remainder of the product from C-1 was reloaded into the vessel in the dry box and milled for an additional 6 hours while cooling the vessel. A sample was removed and analyzed by XRD. The sample had been milled for a total period of 10 hours. The XRD spectrum is shown as Sample C-2 in FIG. 3. Again note that the product appears to be amorphous.

C-3 $MgCl_2.PhOH$, 24 hours milling

The remainder of the product was again milled for 14 additional hours with cooling, giving a total milling time of 24 hours. A sample was again removed in the dry box and an XRD analysis made. The XRD spectrum is shown as Sample C-3 on FIG. 3. The spectrum appears to be developing peaks, indicating some amount of crystallinity in the product.

C-4 $MgCl_2.PhOH$, 4 hours milling

The vessel containing the dry, clean steel balls was taken into the dry box and charged with a 12.57 g (132 mmoles) sample of anhydrous $MgCl_2$ and 12.43 g (132 mmoles) of Baker reagent grade phenol (containing less than 0.1% $H_2O$). The contents are milled for 4.0 hours without cooling the vessel or contents. A sample was removed as before and analyzed by XRD, the spectrum of which is shown in FIG. 3 as Sample C-4. Note that this spectrum clearly denotes the crystalline nature of the product, demonstrating sharp peaks.

EXAMPLE XII

Production of crystalline 4-PP adducts of $MgCl_2$

D-1 $MgCl_2.4$-PP, 4 hours milling

The vessel containing the dry, clean steel balls was taken into the dry box and charged with 8.97 g (94.2 mmoles) anhydrous $MgCl_2$ and 16.03 g (94.2 mmoles) 4-PP (obtained from Aldrich Chemical Co). The contents were milled 4 hours, cooling the vessel with spraying water. After milling, the vessel was returned to the dry box and unloaded through a sieve, a free flowing white powder with a very faint reddish tinge. A sample of the product was analyzed by XRD. The XRD spectrum appears in FIG. 4 as Sample D-1. The spectrum indicates the presence of an amorphous material due to its lack of discreet peaks.

D-2 $MgCl_2.4$-PP, 24 milling

The remainder of the product from D-1 was reloaded into the vessel in the dry box. Milling was continued for an additional 20 hours while cooling the vessel. A sample was removed and analyzed by XRD, the spectrum for which appears in FIG. 4 as Sample D-2. Again the absence of any discreet peaks indicates the presence of an amorphous material.

D-3 $MgCl_2.4$-PP, 4 hours milling

The vessel containing the dry, clean steel balls was taken into the dry box and charged with 8.97 g (94.2 mmoles) anhydrous $MgCl_2$ and 16.03 g (94.2 mmoles) Aldrich 4-PP. The contents were milled for 4.0 hours without cooling the vessel or its contents. A sample was removed and analyzed by XRD, the spectrum for which appears in FIG. 4 as sample D-3. Note that several discreet peaks have appeared between $2\theta = 10°$ and 20° indicating crystallinity in the product.

D-4 MgCl$_2$.4-PP, 7 hours milling

The vessel with the remainder of the product from D-3 was removed from the dry box and milling was continued for an additional 3 hours without cooling. A sample of the product, which had been milled for a total of 7.0 hours was analyzed by XRD. The XRD spectrum appears in FIG. 4 as Sample D-4. The presence of sharp peaks indicates a crystalline product.

While this invention has been described in detail for the purpose of illustration, it is not to be construed as limited thereto, but it is intended to cover all changes and modifications within the spirit and scope thereof.

That which is claimed is:

1. A crystalline adduct consisting essentially of MgCl$_2$ complexed with an electron donor selected from the group consisting of an alcohol and a phenol in an equal molar ratio, such that said crystalline adduct has the sharp x-ray diffraction spectrum peaks associated with crystalline materials, said spectrum being characterized by the absence of the peak which normal crystalline MgCl$_2$ has at $2\theta = 15°$ and the absence of any substantial peaks in the $2\theta$ range of 45°–55°.

2. A crystalline adduct according to claim 1 consisting essentially of MgCl$_2$.CH$_3$OH having the sharp x-ray diffraction spectrum peaks associated with crystalline materials, said spectrum being characterized by the absence of the peak which normal crystalline MgCl$_2$ has at 15° to $2\theta$, the presence of a peak at $2\theta = 12°$, and the absence of any substantial peaks in the $2\theta$ range of 45°–55°.

3. A method for preparing said crystalline adduct of claim 2 which comprises pulverizing anhydrous MgCl$_2$ and MgCl$_2$.6CH$_3$OH at a temperature in the range of about 0° C. to about 100° C. for a time period in the range of about 1 hour to about 10 days.

4. A method for preparing said crystalline adduct of claim 1 which comprises pulverizing anhydrous MgCl$_2$ and said electron donor selected from the group consisting of an alcohol and phenol at a temperature in the range of about 0° C. to about 100° C. for a time period in the range of about 1 hour to about 10 days.

5. A method according to claim 3 wherein said pulverizing is conducted at a temperature in the range of about 20° C. to about 50° C.

6. A method according to claim 4 wherein said pulverizing is carried out for a period of about 2 hours to about 2 days.

7. A method for preparing a crystalline adduct consisting essentially of MgCl$_2$.CH$_3$OH having the sharp x-ray diffraction spectrum peaks associated with crystalline materials, said spectrum being characterized by the absence of the peak which normal crystalline MgCl$_2$ has at $2\theta = 15°$, the presence of a peak at $2\theta = 12°$, and the absence of any substantial peaks in the $2\theta$ range of 45°–55°; wherein said method comprises pulverizing anhydrous MgCl$_2$ and MgCl$_2$.6CH$_3$OH, wherein said pulverizing is carried out at a temperature in the range of 25°–30° C. for a period of 4–16 hours.

8. A method according to claim 4 wherein said electron donor is a phenol.

9. A method according to claim 8 wherein said pulverizing is conducted at a temperature in the range of about 70° C. to about 90° C.

10. A method according to claim 9 wherein said pulverizing is carried out for a period of about 4–24 hours.

11. A crystalline adduct prepared by the method of claim 9 which consists essentially of MgCl$_2$.phenol.

12. A crystalline adduct prepared by the method of claim 9 which consists essentially of MgCl$_2$.4-phenyl phenol.

* * * * *